United States Patent
Park et al.

(10) Patent No.: US 7,705,278 B2
(45) Date of Patent: Apr. 27, 2010

(54) BACKLIGHT UNIT AND METHOD OF DRIVING THE SAME CONTROLLING TEMPERATURE OF THE BACKLIGHT UNIT

(75) Inventors: Jung Kyu Park, Seoul (KR); Seong Ah Joo, Suwon (KR); Hun Joo Hahm, Seongnam (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/000,959

(22) Filed: Dec. 19, 2007

(65) Prior Publication Data

US 2009/0072119 A1    Mar. 19, 2009

(30) Foreign Application Priority Data

Sep. 17, 2007    (KR) .................... 10-2007-0094377

(51) Int. Cl.
*G01J 1/32* (2006.01)
*G09G 3/36* (2006.01)

(52) U.S. Cl. ...................................... 250/205; 345/102
(58) Field of Classification Search ................. 250/205; 345/77, 81, 102
See application file for complete search history.

(56) References Cited

U.S. PATENT DOCUMENTS

| | | | |
|---|---|---|---|
| 2005/0276053 A1* | 12/2005 | Nortrup et al. | 362/294 |
| 2006/0221047 A1 | 10/2006 | Tanizoe et al. | |
| 2007/0274093 A1* | 11/2007 | Haim et al. | 362/561 |

* cited by examiner

*Primary Examiner*—Thanh X Luu
(74) *Attorney, Agent, or Firm*—McDermott Will & Emery LLP

(57) ABSTRACT

Provided is a backlight unit including one or more white light emitting diodes (LEDs) for generating light; an LED module having a printed circuit board (PCB), the LED module supporting and driving the white LED; a sensor for detecting the color temperature of the white LED; a heat generating element connected to the LED module; and a controller for controlling the sensor, the LED module, and the heat generating element.

12 Claims, 2 Drawing Sheets

[FIG. 1]
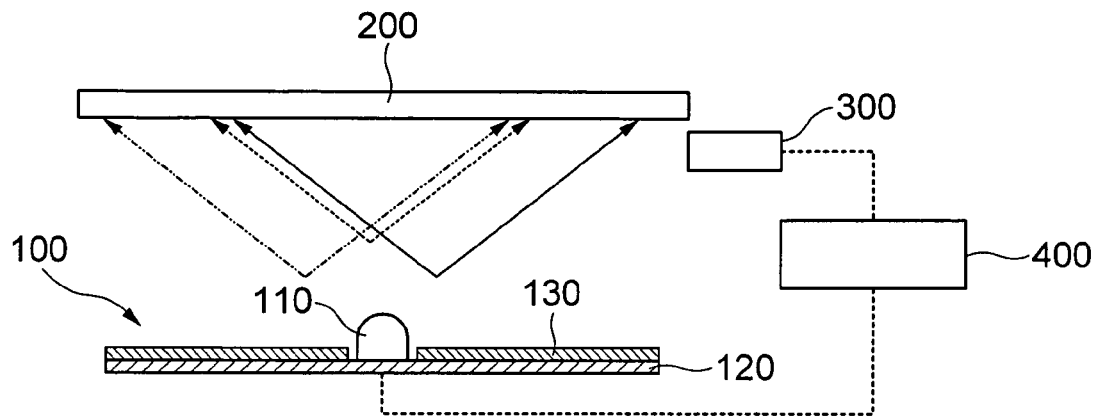
[FIG. 2]
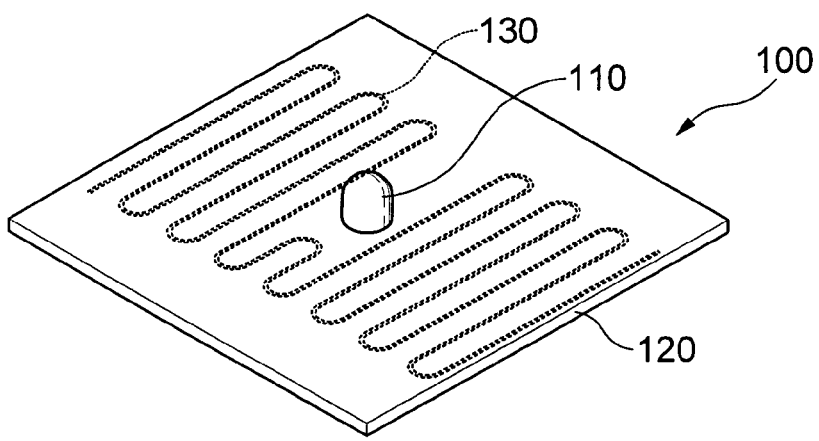
[FIG. 3]
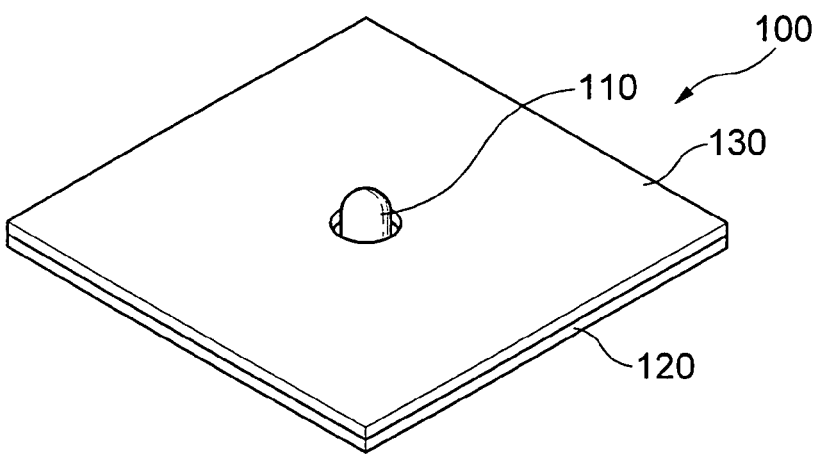

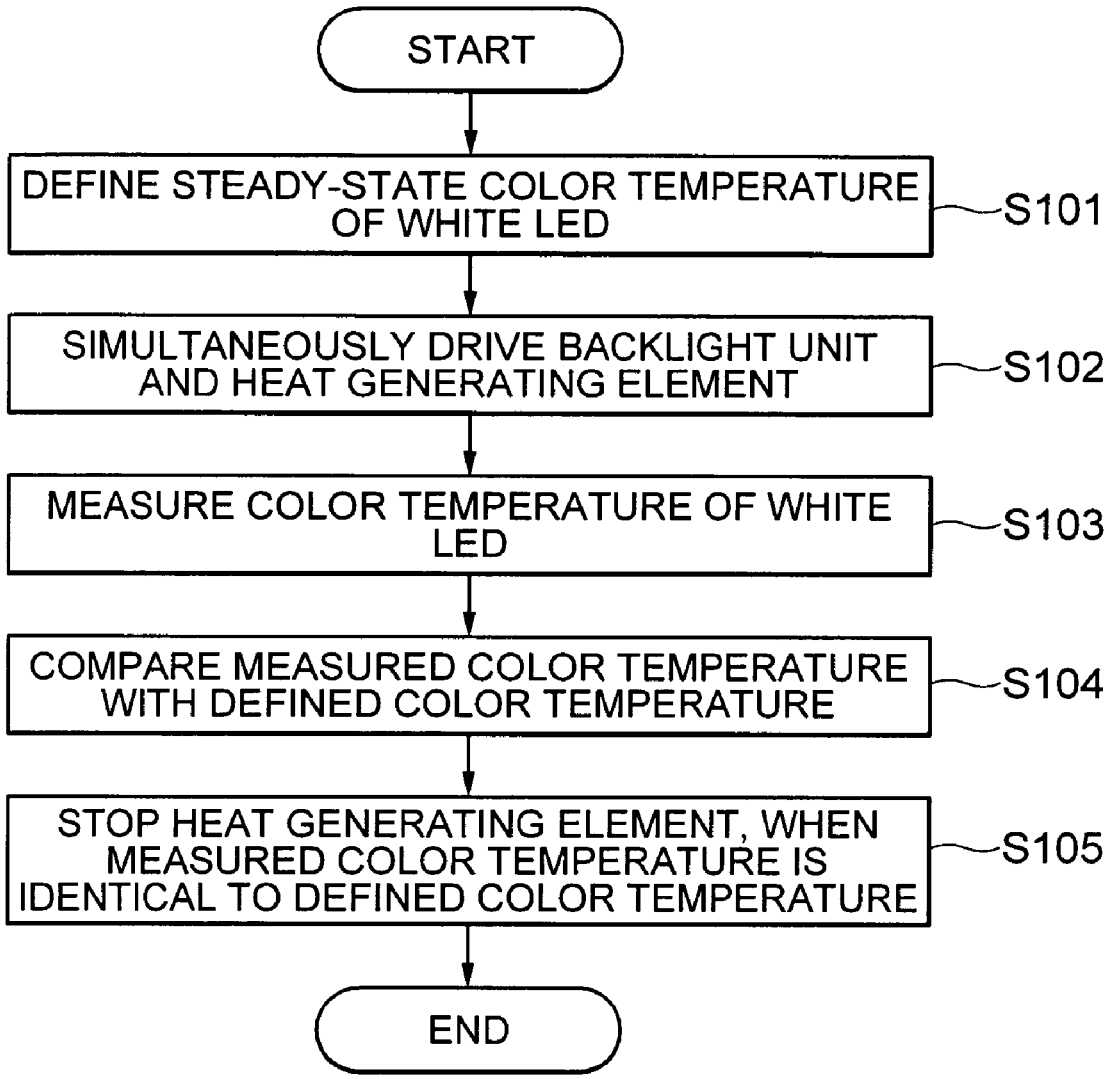

BACKLIGHT UNIT AND METHOD OF DRIVING THE SAME CONTROLLING TEMPERATURE OF THE BACKLIGHT UNIT

CROSS-REFERENCE TO RELATED APPLICATIONS

This application claims the benefit of Korean Patent Application No. 10-2007-0094377 filed with the Korean Intellectual Property Office on Sep. 17, 2007, the disclosure of which is incorporated herein by reference.

BACKGROUND OF THE INVENTION

1. Field of the Invention

The present invention relates to a backlight unit and a method of driving the same, which uses a white light emitting diode (LED) as a light source and can achieve high efficiency and reliability in controlling a color temperature.

2. Description of the Related Art

Recently, with the rapid development of the semiconductor industry, products have been reduced in size and weight, and the performance thereof has become much stronger. Cathode ray tubes (CRT) which are widely used in information display devices have a number of advantages in terms of performance and price. However, the CRTs have a disadvantage in terms of size and portability. To overcome such a disadvantage, liquid crystal displays (LCD) are proposed as one measure. The LCDs have a number of advantages in terms of size, weight, power consumption. Therefore, the LCDs are being considered to be a substitute which can overcome the disadvantage of the CRTs. Currently, the LCDs are mounted on almost all information processing equipments which require display devices.

LCDs are referred to as display devices which apply a voltage to a specific molecular arrangement of liquid crystal to change into another molecular arrangement and converts changes in optical properties of liquid crystal cells, which emit light through such a molecular arrangement, into visual changes. That is, the LCDs use modulation of light caused by the liquid crystal cells. The optical properties of the liquid crystal cells include a birefringence property, optical rotary power, dichroism, a light scattering property and so on.

Such an LCD is a passive element which does not emit light. Therefore, the LCD illuminates an LCD panel by using a backlight unit attached on a rear surface of the LCD panel. The light transmittance of the LCD panel is adjusted by an applied electrical signal. Accordingly, a still image or moving image is displayed on the LCD panel.

In the backlight unit which supplies light to the LCD panel, a cold cathode fluorescent lamp (CCFL) has been widely used. Recently, however, various types of display devices such as a portable device, a field sequential color LCD and so on and backlight units using an LED are being widely used through an enhanced driving method.

The LED is a point source of light having a smaller light emission area than the CCFL. Light emitted from the LED is incident on a side surface of a light guide plate which guides a light path, and the light guide plate changes the light emitted from the LED into a surface source of light to supply to the LCD panel.

In general, to represent a natural color, the LED uniformly controls the luminance of three kinds of red, green, and blue LEDs such that white chromaticity coordinates are adjusted. At this time, the luminance of each LED should be controlled in such a manner that the luminance of light emitted from the backlight unit and the white chromaticity coordinates are adjusted. For this, a voltage control method is used, in which a constant voltage is applied to the LED and the time span of the applied voltage is adjusted so as to control the luminance and the white chromaticity coordinates.

However, when the luminance and the white chromaticity coordinates are controlled by the above-described method, a constant voltage is applied to each LED, and a pulse width of the constant voltage is modulated so as to supply power to the LED. Then, a time span where the LED is lit is adjusted. Therefore, as the pulse width increases, the LED itself is deteriorated. Accordingly, the life span of the LED is reduced, and the luminance is reduced. Then, the white chromaticity coordinates become unstable.

To solve such a problem, Korea Patent Laid-Open Publication No. 2007-44885 discloses a technique in which when the luminance and color temperature of each LED is changed depending on a temperature, a sensor detects the color temperature of each LED, and a controller attached to each LED changes an applied current of the LED such that the luminance and white chromaticity coordinates of the LED is uniformly controlled.

However, when the backlight unit is formed using only a white LED composed of a phosphor and a blue or near ultraviolet LED, not three kinds of red, green, and blue LEDs, the temperature of a light emitting section continuously changes until it reaches a steady state from when power is applied to the backlight unit, that is, when the backlight unit is driven. Therefore, although the sensor capable of detecting a color temperature is provided, it is impossible to continuously control the color temperature. Accordingly, it is difficult to uniformly maintain the white chromaticity coordinates, even though the luminance can be constantly maintained.

SUMMARY OF THE INVENTION

An advantage of the present invention is that it provides a backlight unit which can minimize a variation in color temperature by uniformly maintaining a color temperature.

Another advantage of the invention is that it provides a method of driving the backlight unit.

Additional aspects and advantages of the present general inventive concept will be set forth in part in the description which follows and, in part, will be obvious from the description, or may be learned by practice of the general inventive concept.

According to an aspect of the invention, a backlight unit comprises one or more white light emitting diodes (LEDs) for generating light; an LED module having a printed circuit board (PCB), the LED module supporting and driving the white LED; a sensor for detecting the color temperature of the white LED; a heat generating element connected to the LED module; and a controller for controlling the sensor, the LED module, and the heat generating element.

Preferably, the heat generating element is formed integrally with the LED module. More specifically, the heat generating element is a hot wire which is formed in the LED module so as not to come in contact with the white LED.

Preferably, the heat generating element is formed separately from the LED module. More specifically, the heat generating element is a hot plate which is formed on the LED module so as not to come in contact with the white LED.

According to another aspect of the invention, a method of driving a backlight unit, which includes a white LED, an LED module for supporting the white LED, and a heat generating element connected to the LED module, comprises the steps of: defining a steady-state color temperature of the white LED; driving the backlight unit and the heat generating element at the same time; measuring the color temperature of the white LED; comparing the measured color temperature of the white LED with the defined steady-state color temperature of the white LED; and stopping the heat generating element, when the measured color temperature of the white LED is identical to the defined steady-state color temperature of the white LED.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a schematic view of a backlight unit according to an embodiment of the present invention;

FIGS. 2 and 3 are diagrams illustrating the heat generating element of the backlight unit according to an embodiment of the invention; and FIG. 4 is a flow chart sequentially showing a method of driving a backlight unit according to an embodiment of the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures. In the drawings, the thicknesses of layers and regions are exaggerated for clarity.

Structure of Backlight Unit

Hereinafter, a backlight unit according to an embodiment of the present invention will be described in detail with reference to the accompanying drawings.

FIG. 1 is a schematic view of a backlight unit according to an embodiment of the present invention.

Referring to FIG. 1, the backlight unit 100 according to an embodiment of the invention serves to supply light to an LCD panel 200 and includes at least one or more white LEDs 110 which generate light, an LED module 120 having a PCB which supports and drives the white LED 110, and a heat generating element 130 connected to the LED module 120.

The white LED 110 may be formed of a combination of a typical phosphor and a blue LED or a combination of a phosphor and a near ultraviolet LED.

The heat generating element 130 may be composed of a hot wire or a hot plate and may be formed integrally with or separately from the LED module.

Now, referring to FIGS. 2 and 3, the heat generating element according to the invention will be described. FIGS. 2 and 3 are diagrams illustrating the heat generating element of the backlight unit according to an embodiment of the invention.

FIG. 2 illustrates a state where the heat generating element 130 is composed of a hot wire and is formed integrally with the LED module 120. The hot wire is formed in the LED module 120 so as not to come in contact with the white LED 100. Accordingly, when the LED module 120 is driven, the hot wire serves to maintain the color temperature of the white LED 110 to the same temperature as a color temperature at which the white LED 110 reaches a steady state.

FIG. 3 illustrates a state where the heat generating element 130 is composed of a hot plate and is formed separately from the LED module 120. The hot plate is formed on the LED module 120 so as not to come in contact with the white LED 110. When the LED module 120 is driven, the hot plate also serves to maintain the color temperature of the white LED 110 to the same temperature as a color temperature at which the white LED 110 reaches a steady state.

The backlight unit according to the invention further includes a sensor 300 for detecting the color temperature of the white LED 100 and a controller 400 for controlling the sensor 300, the LED module 120, and the heat generating element 130.

Method of Driving Backlight Unit

Referring to FIGS. 1 and 4, a method of driving a backlight unit according to an embodiment of the invention will be described.

FIG. 4 is a flow chart sequentially showing a method of driving a backlight unit according to an embodiment of the invention.

Referring to FIG. 4, the method of driving a backlight unit according to an embodiment of the invention includes defining a steady-state color temperature of a white LED (step S101); driving the white LED and a heat generating element at the same time (step S102); measuring the color temperature of the white LED (step S103); comparing the measured color temperature of the white LED with the defined steady-state color temperature of the white LED (step S104); and stopping the heat generating element when the color temperature of the white LED is identical to the steady-state color temperature of the white LED (step S105).

More specifically, in step S101, the steady-state color temperature of the white LED 110 is a color temperature where the color temperature of the white LED 110 gradually increases from when the backlight unit 100 is driven and is then stabilized. In general, since the color temperature of a backlight unit using a white LED continuously changes until the color temperature is stabilized from when the backlight unit is driven, a variation in color temperature is large. Therefore, in the present invention, a color temperature at which the stabilization of the white LED 110 is achieved is first defined.

Next, when the white LED 110 is driven, the heat generating element 130 is simultaneously driven (step S102). The color temperature of the white LED 100, when it is driven, is lower than the steady-state color temperature thereof. Therefore, the color temperature of the white LED 100 should be increased to the steady-state color temperature through the heat generating element 130.

Subsequently, the color temperature of the white LED 110 is measured through the sensor 300 (step S103), and the measured color temperature of the white LED 110 is compared with the defined steady-state color temperature of the white LED 110 by the controller 400 (step S104).

Then, when the measured color temperature of the white LED 110 is identical to the defined steady-state color temperature of the white LED 110, the heat generating element 130 is stopped (step S105).

Accordingly, the backlight unit according to the invention can maintain the color temperature of the white LED to the same temperature as the steady-state color temperature from when the backlight unit is driven, which makes it possible to minimize a variation in color temperature.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A backlight unit comprising:
   one or more white light emitting diodes (LEDs) for generating light;
   an LED module having a printed circuit board (PCB), the LED module supporting and driving the white LED;
   a sensor for detecting the color temperature of the white LED;
   a heat generating element connected to the LED module; and
   a controller for controlling the sensor, the LED module, and the heat generating element,
   wherein the heat generating element serves to maintain the color temperature of the white LED to same temperatures as a color temperature at which the white LED reaches a steady-state when the LED module is driven.

2. The backlight unit according to claim 1, wherein the heat generating element is formed integrally with the LED module.

3. The backlight unit according to claim 2, wherein the heat generating element is a hot wire which is formed in the LED module so as not to come in contact with the white LED.

4. The backlight unit according to claim 1, wherein the heat generating element is formed separately from the LED module.

5. The backlight unit according to claim 4, wherein the heat generating element is a hot plate which is formed on the LED module so as not to come in contact with the white LED.

6. The back light unit of claim 1, wherein the white LEDs are formed on the LED module and the heat generating element are formed on a region of the LED module where the white LEDs are not formed.

7. A method of driving a backlight unit, which includes a white LED, an LED module for supporting the white LED, and a heat generating element connected to the LED module, the method comprising the steps of:
   defining a steady-state color temperature of the white LED;
   driving the backlight unit and the heat generating element to maintain the color temperature of the white LED to same temperatures as a color temperature at which the white LED reaches a steady-state when the LED module is driven at the same time;
   measuring the color temperature of the white LED;
   comparing the measured color temperature of the white LED with the defined steady-state color temperature of the white LED; and
   stopping the heat generating element, when the measured color temperature of the white LED is identical to the defined steady-state color temperature of the white LED.

8. The method according to claim 7, wherein the heat generating element is formed integrally with the LED module.

9. The method according to claim 8, wherein the heat generating element is a hot wire which is formed in the LED module so as not to come in contact with the white LED.

10. The method according to claim 7, wherein the heat generating element is formed separately from the LED module.

11. The method according to claim 10, wherein the heat generating element is a hot plate which is formed on the LED module so as not to come in contact with the white LED.

12. The method of claim 7, wherein the white LEDs are formed on the LED module and the heat generating element are formed on a region of the LED module where the white LEDs are not formed.

* * * * *